(12) United States Patent
Sapir et al.

(10) Patent No.: US 8,415,819 B2
(45) Date of Patent: Apr. 9, 2013

(54) ENERGY HARVESTING BUOY

(75) Inventors: Itzhak Sapir, Irvine, CA (US); W. Eric Boyd, Irvine, CA (US)

(73) Assignee: ISC8 Inc., Costa Mesa, CA (US)

( * ) Notice: Subject to any disclaimer, the term of this patent is extended or adjusted under 35 U.S.C. 154(b) by 388 days.

(21) Appl. No.: 12/806,124

(22) Filed: Aug. 4, 2010

(65) Prior Publication Data

US 2011/0031749 A1 Feb. 10, 2011

Related U.S. Application Data

(60) Provisional application No. 61/273,575, filed on Aug. 6, 2009.

(51) Int. Cl.
*F03B 13/10* (2006.01)

(52) U.S. Cl.
USPC .......................................................... 290/53

(58) Field of Classification Search .............. 290/53–55, 290/42–44
See application file for complete search history.

(56) References Cited

U.S. PATENT DOCUMENTS

| | | | | |
|---|---|---|---|---|
| 4,442,372 A * | 4/1984 | Roberts | | 310/339 |
| 6,011,346 A * | 1/2000 | Buchanan et al. | | 310/339 |
| 7,246,660 B2 * | 7/2007 | Fripp et al. | | 166/65.1 |
| 2002/0043895 A1* | 4/2002 | Richards et al. | | 310/328 |
| 2002/0067043 A1* | 6/2002 | Ovadia | | 290/53 |
| 2005/0280334 A1* | 12/2005 | Ott et al. | | 310/339 |
| 2008/0260548 A1* | 10/2008 | Ahdoot | | 417/333 |
| 2009/0167114 A1 | 7/2009 | Sapir | | |
| 2011/0074160 A1* | 3/2011 | Chua | | 290/53 |

* cited by examiner

*Primary Examiner* — Jean F Duverne
(74) *Attorney, Agent, or Firm* — W. Eric Boyd, Esq.

(57) ABSTRACT

An energy-harvesting buoy is provided comprising an air-pressure generator, such as a piezo-electric generator, or any other generator that can harvest energy from an air pressure. The energy harvesting buoy consists of a first float and a second float. An air pressure is created when relative vertical motion occurs between the first float and the second float which drives an air pressurization means such as a piston driven air pump using a linkage member pivotably mounted between the respective floats. The generator uses the air pressure from the air pressurization means to drive the generator to generate electrical power.

11 Claims, 1 Drawing Sheet

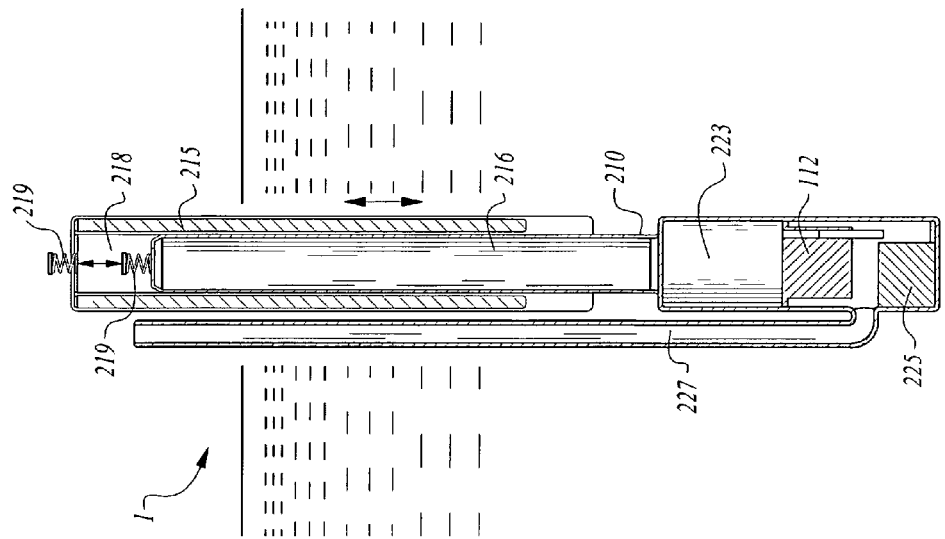
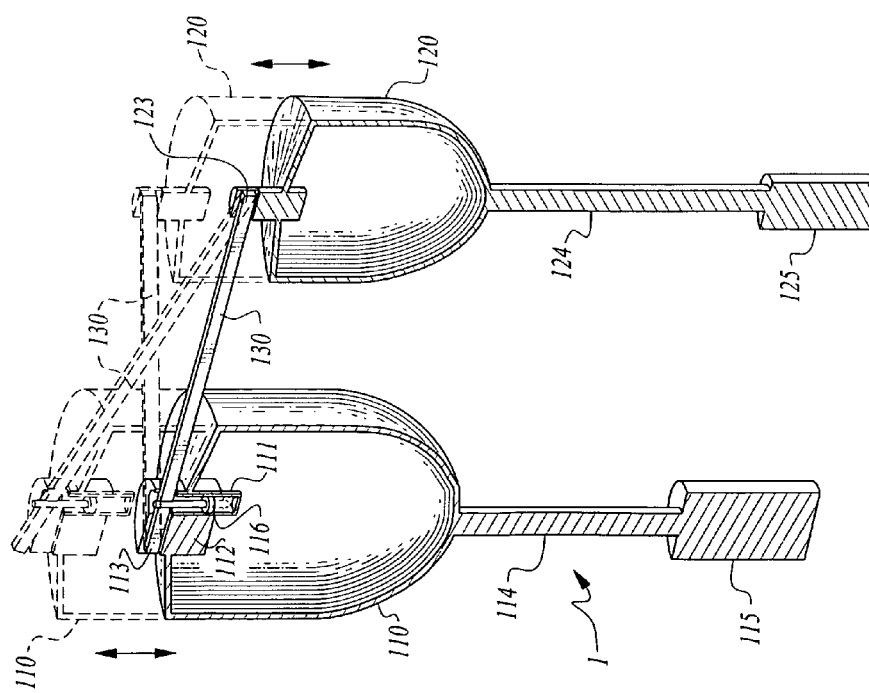
Fig. 1
Fig. 2

ENERGY HARVESTING BUOY

CROSS-REFERENCE TO RELATED APPLICATIONS

This application claims the benefit of U.S. Provisional Patent Application 61/273,575, filed on Aug. 6, 2009, entitled "Energy Harvesting Buoy" pursuant to 35 USC 119, which provisional application is incorporated fully herein by reference.

STATEMENT REGARDING FEDERALLY SPONSORED RESEARCH AND DEVELOPMENT

Not applicable.

DESCRIPTION

1. Field of the Invention

The invention relates generally to the field of energy-generation technology. More specifically, the invention relates to a buoy assembly that generates electrical energy using a modulated or unmodulated air-pressure generator.

2. Background of the Invention

Several ocean energy extraction concepts are known and presently used to some degree in various marine applications. These include, but are not limited to, anchored energy-generating devices where the relative motion between a rigidly anchored component and a wave-driven flap is used to drive a generator, the use of near-shore water currents that are tunneled to ducted turbines, and devices that convert wave motion to vibration to electrical power that is then "harvested" by piezo-vibration devices.

These prior art energy-extracting technologies have limitations due to the need for anchoring, specific location and limited performance and efficiency in the case of vibration harvesters. The requirement for operation in open sea where marine energy may be insufficient to drive prior art devices sets a limit to the efficiency and performance level of existing energy-extraction systems. Additionally, the depth in open sea complicates the deployment of a buoy if rigid anchoring to the sea floor is required.

The invention herein comprises an electrical energy harvesting buoy assembly that uses a novel method of sea-surface energy extraction. The energy-harvesting buoy of the invention includes two major innovations that, when combined in a single system, offers a free-floating ocean energy-extraction device capable of producing electrical power even in relatively calm sea conditions.

The invention takes advantage of two innovations; a wave-energy extraction method, i.e., the wave-powered air pump. This function is incorporated into the energy-harvesting buoy physical design, and the mechanical drive mechanism of the above-air pressurization means in cooperation with an air-pressure generator.

BRIEF SUMMARY OF THE INVENTION

The wave-powered air pressurization means in the energy-harvesting buoy of the invention takes advantage of waves or ocean swell energy in a different manner than the prior art methods described above. The preferred embodiment of the energy-harvesting buoy herein generates pressurized air that is, in turn, stored in an onboard air tank or pressure accumulator. The device functionally acts as a piston and check valve in an air-pump much like the one used for bicycles.

The invention generally comprises a free-floating buoy assembly comprised of two bodies capable of floating in a fluid such as water in an ocean or lake independently of one another. One of the bodies acts as the main buoy and the other acts as a drive float that mounted on it or next to it in a way that relative vertical motion between the buoy and float can occur.

An air pressurization means such as an air pump structure is driven such that it pressurizes a volume of air when relative motion between the buoy and float occurs. When the assembly encounters a wave or swell, both the buoy and the float are lifted and lowered at different points in time as the swell energy passes underneath them. The amount of lift force and submersion is determined by the buoyancy and weight of the two bodies.

These characteristics are designed to be different from one another and, as a result, the dynamic response of the two bodies to waves is different and relative motion between them occurs. The energy generated by the system is initially in the form of compressed air stored in a tank inside the main buoy. The amount of energy collected by the device is proportional to the net force applied by one moving body on the other, the length of the relative motion (stroke), the number of power generating operations in a period of time (average frequency) and the conversion efficiency of the generator.

The energy harvesting buoy of the invention may generally comprise a first float and a second float pivotably connected to it. The respective float bodies each have their own predetermined weight and buoyancy characteristics. As a result, the two float bodies have different predetermined dynamic responses to waves in the vertical direction (i.e., floatation and submersion). The weight and buoyancy characteristics of the two floats are designed to maximize the relative motion effect (stroke and relative force) between them.

In this manner, when relative vertical motion between the first float and the second float occurs as a result of surface wave energy, an oscillating and "pumping" action takes place between the float bodies and air is compressed into the pressure tank. The pressurized air is stored and used by air-pressure generator in the form of modulated or unmodulated air pressure of the device to generate electricity.

The air-pressure generator of the invention is preferably a pressurized air-to-electricity conversion device. In a preferred embodiment, the air-pressure generator is comprised of a stacked assembly of piezo-cantilever arrays connected in a parallel/serial electrical circuit such as is disclosed in U.S. Pat. Pub. No. 2009/0167114, published Jul. 2, 2009, entitled "Forced Vibration Piezo Generator and Piezo Actuator" to Sapir.

The cantilevered piezo members in the above-cited air-pressure generator are configured to vibrate when subjected to an air-pressure source to generate electrical power. The air-pressure generator function herein uses a novel drive method for the driving of a piezo-cantilever array; air pressure pulses, for cantilever vibration excitation in the air-pressure generator.

It is expressly noted that the invention herein is not limited to use of the above-cited piezo-cantilever device and that any device capable of producing electrical power from a modulated or unmodulated air-pressure source is suitable for use in the instant invention.

When compared with the small proof mass vibration method used in prior art vibration energy-harvesting cantilevers, the disclosed method and device produces much larger deflection and thus much higher electrical power output.

In a first aspect of the invention, an apparatus is provided for generating electrical energy comprising a first float comprising an air-pressurization means, a second float disposed to cooperate with the first float such that relative vertical motion between the first float and the second float drives the air-pressurization means to generate an air pressure and has an air-pressure generator in fluid communication with the air-pressurization means.

In a second aspect of the invention, the air-pressure generator comprises a piezoelectric generator.

In a third aspect of the invention, at least one of the floats comprises a stabilizing rod.

In a fourth aspect of the invention, at least one of the floats comprises a weight.

In a fifth aspect of the invention, the first float is connected to the second float by means of a linkage member.

In a sixth aspect of the invention, the length of the linkage member is adjustable.

In a seventh aspect of the invention, an apparatus for harvesting energy is provided comprising a main buoy defining a piston, a slideably disposed float member defining a bore where the piston is slideably disposed in the bore, an air-pressure generator powered by the air pressure created by vertical motion between the main buoy and the slideably disposed float member.

In an eighth aspect of the invention, the apparatus comprises at least one unidirectional valve.

In a ninth aspect of the invention, the apparatus further comprises an electrical storage unit for storing the charge created by the air-pressure generator.

In a tenth aspect of the invention, the apparatus further comprises an air pressure vent to exhaust air from the air-pressure generator.

These and other aspects of the invention are discussed in greater detail below and while the claimed apparatus and method herein has or will be described for the sake of grammatical fluidity with functional explanations, it is to be understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

BRIEF DESCRIPTION OF THE DRAWINGS

FIG. 1 is a first preferred embodiment of the energy-harvesting buoy of the invention.

FIG. 2 is an alternative preferred embodiment of the energy-harvesting buoy of the invention.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE INVENTION

Turning now to the figures wherein like numerals define like elements among the several views, FIG. 1 shows a preferred embodiment of the energy harvesting buoy assembly 1.

The preferred embodiment of energy-harvesting buoy 1 is comprised of a first float 110 and a second float 120. First float 110 is further comprised of a modulated or unmodulated air-pressure generator 112 disposed on or proximal first float 110. This air-pressure generator 112 is preferably a piezoelectric generator as described above.

First float 110 is further comprised of a first stabilizing rod 114, such as a prolate or elongate stabilizing rod in cooperation with a first weight 115 which is used to stabilize first float 110 and generally maintain the float member a vertical orientation of each float member while in operation in water much as the weighted keel of a sailboat is used.

A similar structure is used in second float 120 where second stabilizing rod 124 and second weight 125 are used to stabilize second float 120. Second stabilizing rod is preferably comprised of a prolate or elongate stabilizing rod cooperating with second weight 125, which is used to stabilize second float 120 and generally maintain the float member a vertical orientation while in operation in water.

A linkage member 130 having at least one degree-of-freedom of motion, preferably a vertical degree of freedom of motion, is disposed between and connects first float 110 to second float 120 by means of movable pivoting connections or attachments, i.e., first pivoting attachment 113 and second pivoting attachment 123. The first and second pivoting attachments are in mechanical connection with the first float and second floats 110 and 120 and configured to so that vertical motion by second float 120 drives a the air pressurization means 111.

A preferred embodiment of air pressurization means 111 such as the piston/bore assembly air pump shown is provided in the invention. The first and second pivoting attachments in mechanical connection with the piston permit the driving of the piston within the bore as ocean swells pass between the first and second floats, generating relative vertical motion between them.

In an alternative preferred embodiment, the length of linkage member 130 is adjustable whereby a predetermined user-selectable linkage member length between first float 110 and second float 120 can be provided to adjust the moment of force or moment arm between the floats to accommodate local or seasonal marine conditions, preferred stroke of the piston, preferred air pressure in the chamber or other user-preferred mechanical or operational factors.

Air pressurization means 111 is configured such that piston 116 is mechanically connected to linkage member 130 such that piston 116 is free to move vertically within the bore. The vertical motion of piston 116 that occurs between the two float members generates an air pressure. The air pressure is the result of the relative out-of-phase vertical motion of first float 110 and second float 120 that occurs as wave energy (in the form of rising and falling swells) passes between the device floats. In other words, an air pressure is generated as the piston reciprocates within its bore when second float 120 acts in cooperation with linkage 130 to "pump" piston 116, in turn powering the air-pressure generator 112 of the invention.

The air pulses created by wave energy are in fluid communication with the air-pressure generator 112 and act to harvest electrical energy from the environment.

Electrical energy generated by the air pressure generated is preferably stored in an on-board storage battery.

First float 110 and second float 120 each have their own weight and buoyancy characteristics and are best designed to maximize stroke and relative vertical motion between the floats. As a result, first float 110 and second float 120 have different dynamic responses to waves with respect to flotation and submersion. The characteristics of first and second stabilizing rods, 114 and 124 and first and second weights 115 and 125 define the buoyancy characteristics of first and second floats 110 and 120.

However, it is to be understood that the buoyancy characteristics are not exclusively defined by first and second stabilizing rods 114 and 124 and second weights 115 and 125 and that the buoyancy characteristics can be manipulated by a variety of factors including but not limited to varying the volume of first and second floats 110 and 120, variations in the density of the fluid in which first and second floats 110 and 120 are submerged in and other well-known factors concerning buoyancy.

The air-pressure generator of the previously discussed embodiment is a pressurized air-to-electricity conversion device. In a preferred embodiment, the air-pressure generator is comprised of a stacked assembly of piezo-cantilever arrays connected in a parallel/serial electrical circuit such as is disclosed in U.S. Pat. Pub. No. 2009/0167114, published Jul. 2, 2009, entitled "Forced Vibration Piezo Generator and Piezo Actuator" to Sapir but other devices capable of producing electrical power from an air-pressure source are suitable for use in the instant invention.

In an alternative embodiment of the energy-harvesting buoy of FIG. 2, the embodiment is comprised of a main buoy 210, and a slideably disposed float member 215. A piston 216 is affixed atop the main buoy 210. The slideably disposed float member 215 encapsulates the piston 216 in a bore 218 defined therein. The piston 216 and slideably disposed float member 215 are configured such that a bore 218 is disposed above the piston 216 and the below the upper surface of slideably disposed float member 215.

Unidirectional valves 219 are arranged such that an inlet port is present in slideably disposed float member 215 and an outlet port in the piston 216. Pressurized air is allowed to flow into the bore through slideably disposed float member 215 from the outside environment and allowed to escape through the piston 216 into the pressurized air tank 223.

The cooperation of the elements in this preferred embodiment permit the pumping motion between the slideably disposed float member 215 and the main buoy 210 to pressurize air tank 223 when relative vertical motion occurs between the main buoy 210 and slideably disposed float member 215 with sufficient force. The air pumped into the pressurized air tank 223 supplies the pressurized air source for air-pressure generator 112 below it. The pressurized air is then used to create electricity by the air-pressure generator 112. An electrical charge is then stored in the battery unit 225 of the energy-harvesting buoy, and air is exhausted through the air-pressure generator vent 227.

The weight and buoyancy characteristics of main buoy 210 and slideably disposed float member 215 are designed to maximize the relative motion effect. Piston 216 pumps air into air-pressure generator 112 when relative vertical motion between main float body 10 and slideably disposed float member 215 occurs with sufficient force. In this embodiment, the air being pumped by piston 216 into the air-pressure generator 112 is utilized by air-pressure generator 112 to generate electricity.

The air-pressure generator of the previously discussed embodiment is a pressurized air-to-electricity conversion device. In a preferred embodiment, the air-pressure generator is comprised of a stacked assembly of piezo-cantilever arrays connected in a parallel/serial electrical circuit such as is disclosed in U.S. Pat. Pub. No. 2009/0167114, published Jul. 2, 2009, entitled "Forced Vibration Piezo Generator and Piezo Actuator" to Sapir but other devices capable of producing electrical power from an air-pressure source are suitable for use in the instant invention.

Described above are but two exemplary embodiments of the energy harvesting buoy, however, many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. An apparatus for generating electrical energy comprising:
   a floating assembly comprising,
   a first float comprising an air pressurization means,
   a second float connected to and disposed to cooperate with the first float such that an out of phase vertical motion of the first float and a vertical motion of the second float drives the air pressurization means to generate an air pressure, and,
   an air-pressure generator in fluid communication with air-pressurization means.

2. The apparatus of claim 1 where the air-pressure generator comprises a piezoelectric generator.

3. The apparatus of claim 1 wherein at least one of the floats comprises a stabilizing rod.

4. The apparatus of claim 1 wherein at least one of the floats comprises a weight.

5. The apparatus of claim one wherein the first float is connected to the second float by means of a linkage member.

6. The apparatus of claim 5 wherein the length of the linkage member is adjustable.

7. An apparatus for harvesting energy comprising:
a floating assembly comprising,
a main buoy defining a piston,
a slideably disposed float member defining a bore,
the piston slideably disposed in the bore, and,
an air-pressure generator powered by air pressure created by an out of phase vertical motion between the main buoy and vertical motion of the slideably disposed float member.

8. The apparatus of claim 7 further comprising at least one unidirectional valve.

9. The apparatus of claim 7 further comprising an electrical storage unit for storing charge created by the air-pressure generator.

10. The apparatus of claim 7 further comprising an air pressure vent to exhaust air from the air-pressure generator.

11. The apparatus of claim 7 where the air-pressure generator is a piezoelectric generator.

* * * * *